(12) United States Patent
Ayabe et al.

(10) Patent No.: US 7,563,197 B2
(45) Date of Patent: Jul. 21, 2009

(54) SHIFT CONTROL DEVICE AND SHIFT CONTROL METHOD OF AUTOMATIC TRANSMISSION

(75) Inventors: Atsushi Ayabe, Nagoya (JP); Toshio Sugimura, Nagoya (JP); Takahiko Tsutsumi, Toyota (JP); Hisashi Ishihara, Toyoake (JP); Kazuhiro Iketomi, Nagoya (JP); Yosuke Takaie, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 457 days.

(21) Appl. No.: 11/585,169

(22) Filed: Oct. 24, 2006

(65) Prior Publication Data

US 2007/0093358 A1  Apr. 26, 2007

(30) Foreign Application Priority Data

Oct. 26, 2005 (JP) ............................. 2005-312037

(51) Int. Cl.
*F16H 61/12* (2006.01)
(52) U.S. Cl. ...................... 477/121; 477/143; 477/906
(58) Field of Classification Search ................. None
See application file for complete search history.

(56) References Cited

U.S. PATENT DOCUMENTS 3,752,011 A * 8/1973 Casey et al. ............... 475/63
4,653,351 A * 3/1987 Downs et al. ............. 477/148
5,046,174 A * 9/1991 Lentz et al. ................ 701/60
5,109,967 A * 5/1992 Saitou et al. ............... 192/76
5,385,516 A * 1/1995 Grange et al. ............. 477/107
2007/0049458 A1* 3/2007 Ayabe et al. ............... 477/109
2007/0117676 A1* 5/2007 Ayabe et al. ................ 477/34

FOREIGN PATENT DOCUMENTS

| JP | 11-082712 A | 3/1999 |
| JP | 11-141674 A | 5/1999 |
| JP | 2002-89696 A | 3/2002 |

* cited by examiner

Primary Examiner—Sherry Estremsky
(74) Attorney, Agent, or Firm—Sughrue Mion, PLLC

(57) ABSTRACT

In a shift control device and a shift control method of an automatic transmission that establishes a plurality of gear steps of different speed change ratios by selectively engaging a plurality of friction engagement devices, one of a shift start time point and an inertia phase start time point is used as a reference time. In a power-off shift, the shift action is compulsorily ended when the elapsed time from the reference time exceeds a first time. In a power-on shift, the shift action is compulsorily ended when the elapsed time from the reference time exceeds a second time that is set shorter than the first time. If a switch from the power-off shift to the power-on shift occurs halfway through the power-off shift, the shift action is compulsorily ended when the elapsed time from the time point of the switch exceeds a predetermined time.

14 Claims, 14 Drawing Sheets

|   | C1 | C2 | B1 | B2 | B3 |
|---|----|----|----|----|----|
| 1st | O |  |  | O |  |
| 2nd | O |  | O |  |  |
| 3rd | O |  |  |  | O |
| 4th | O | O |  |  |  |
| 5th |  | O |  |  | O |
| 6th |  | O | O |  |  |
| Rev |  |  |  | O | O |

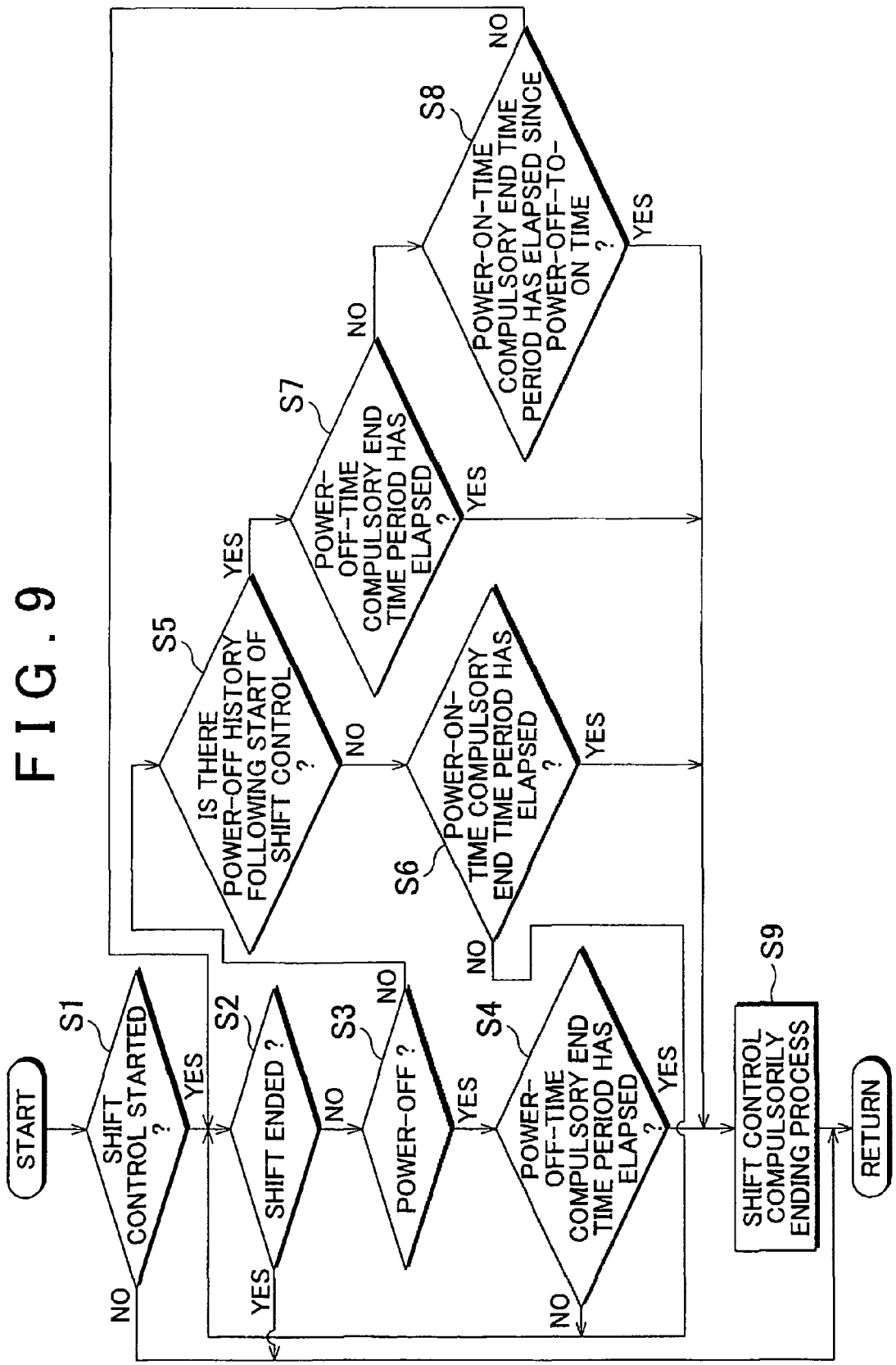

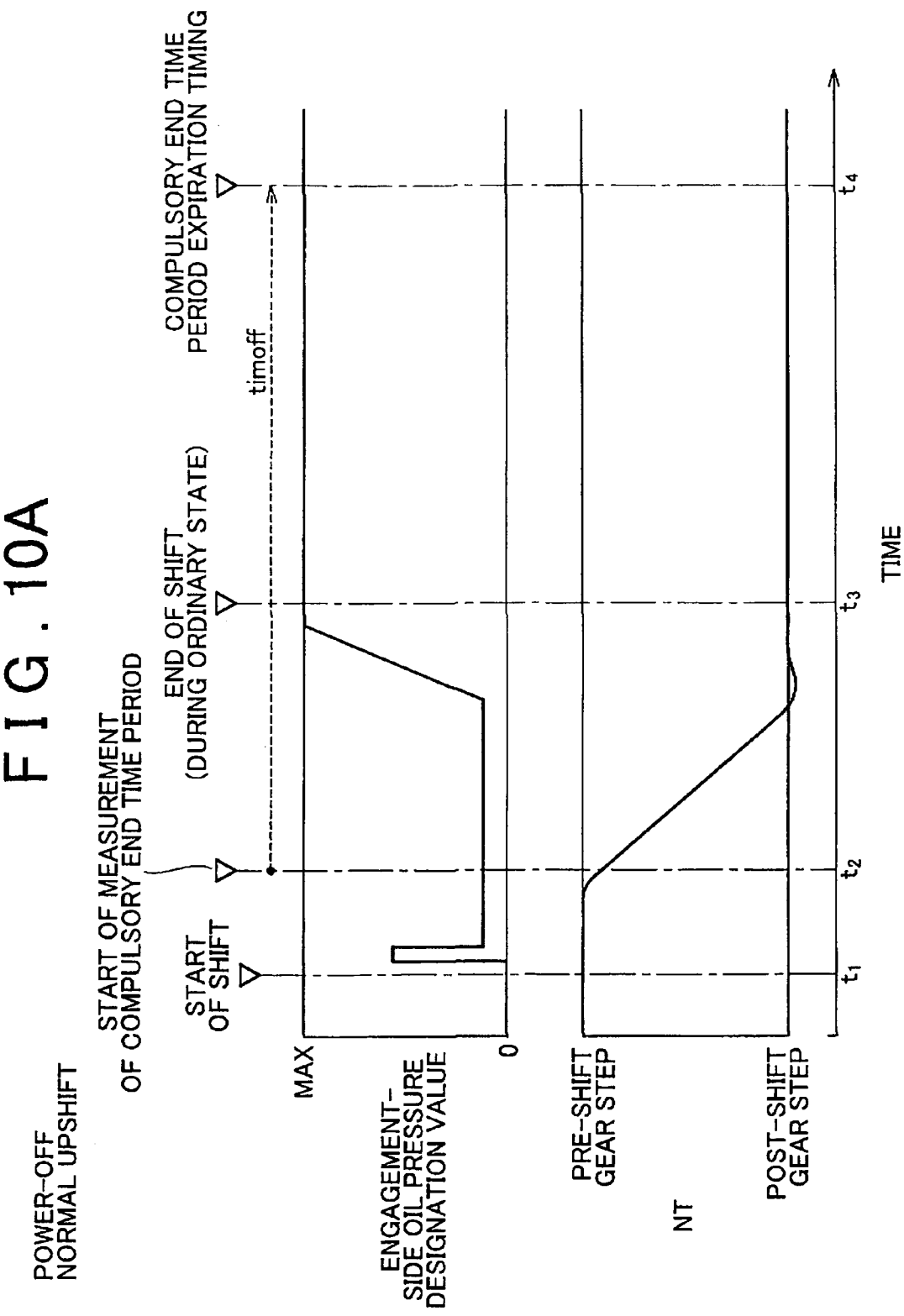

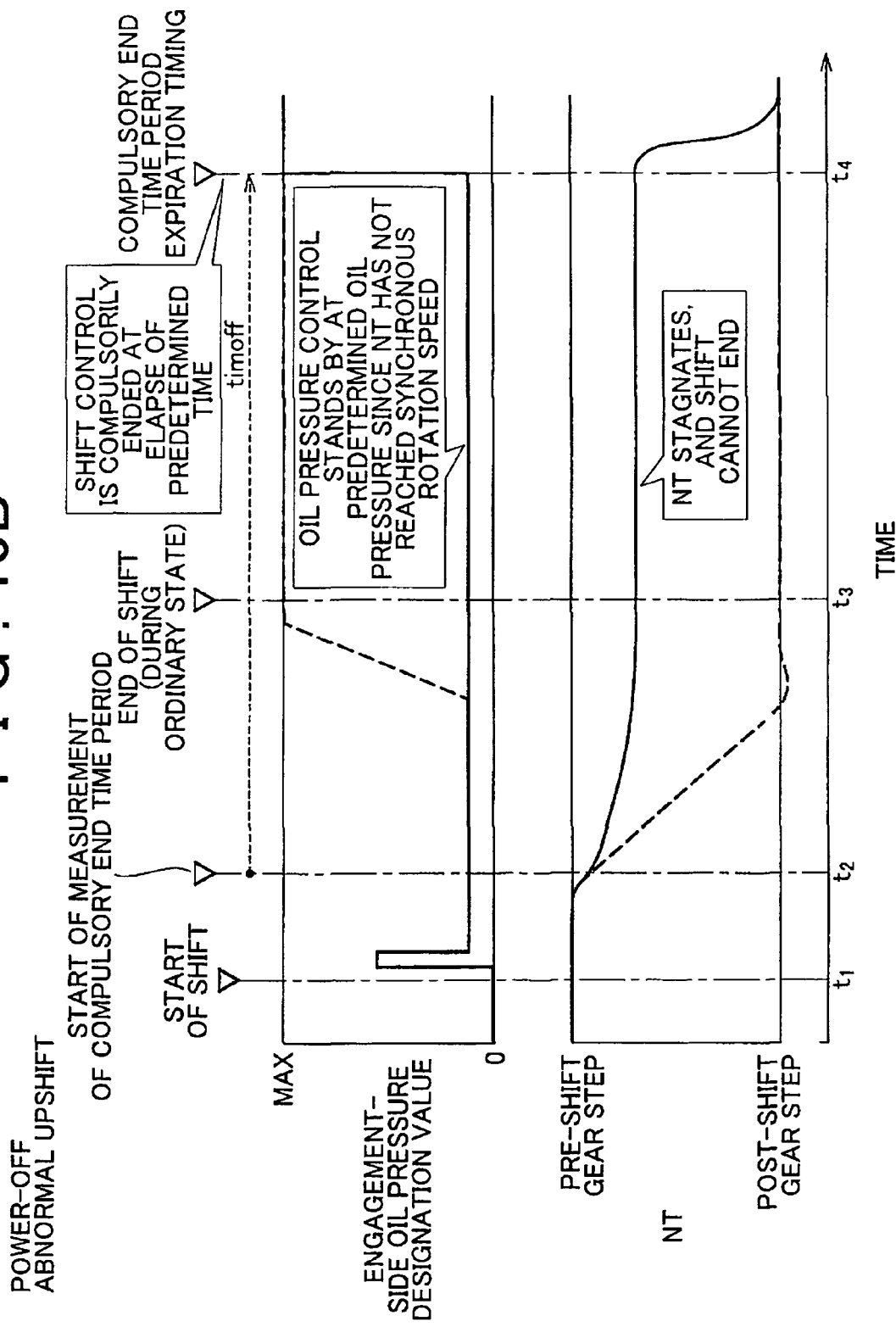

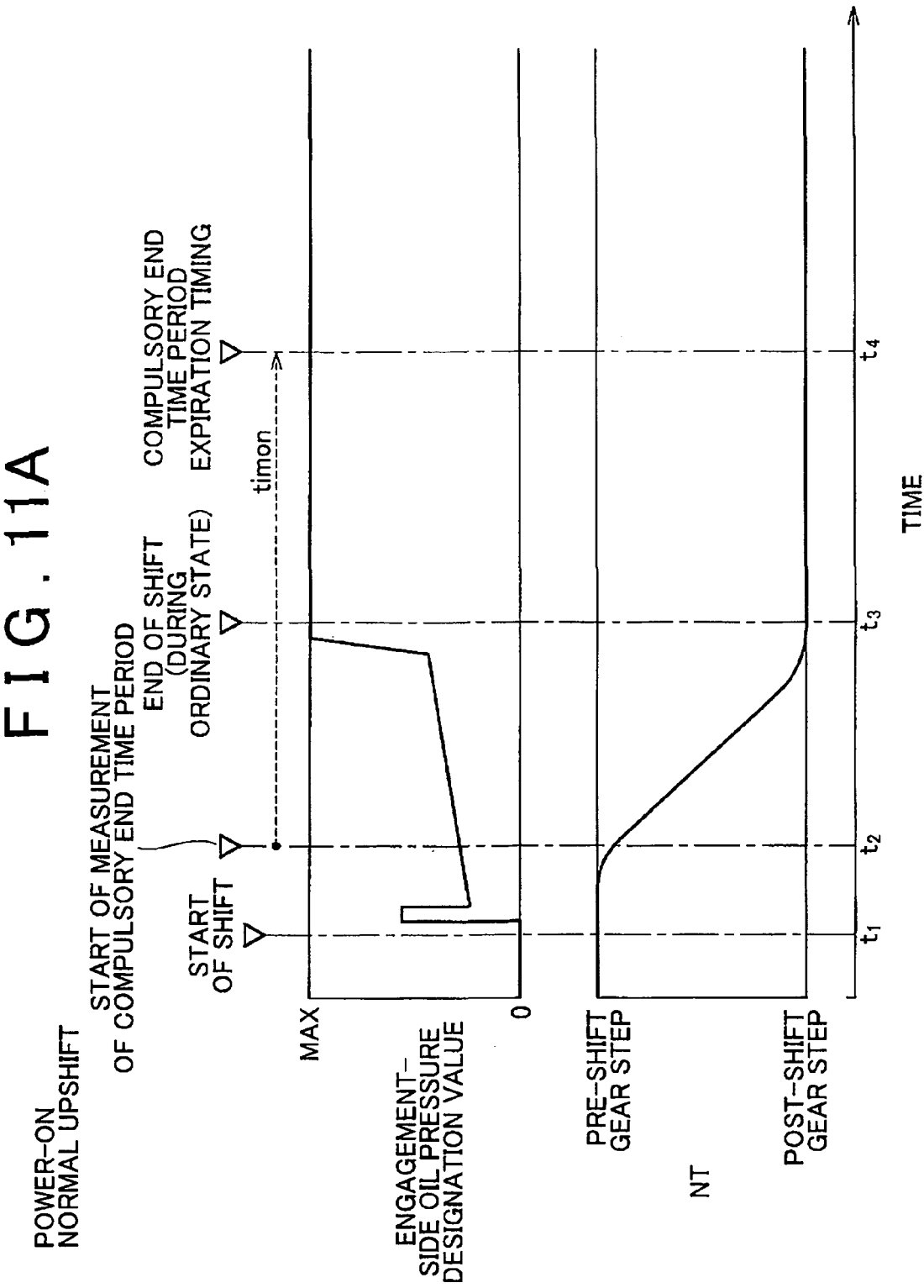

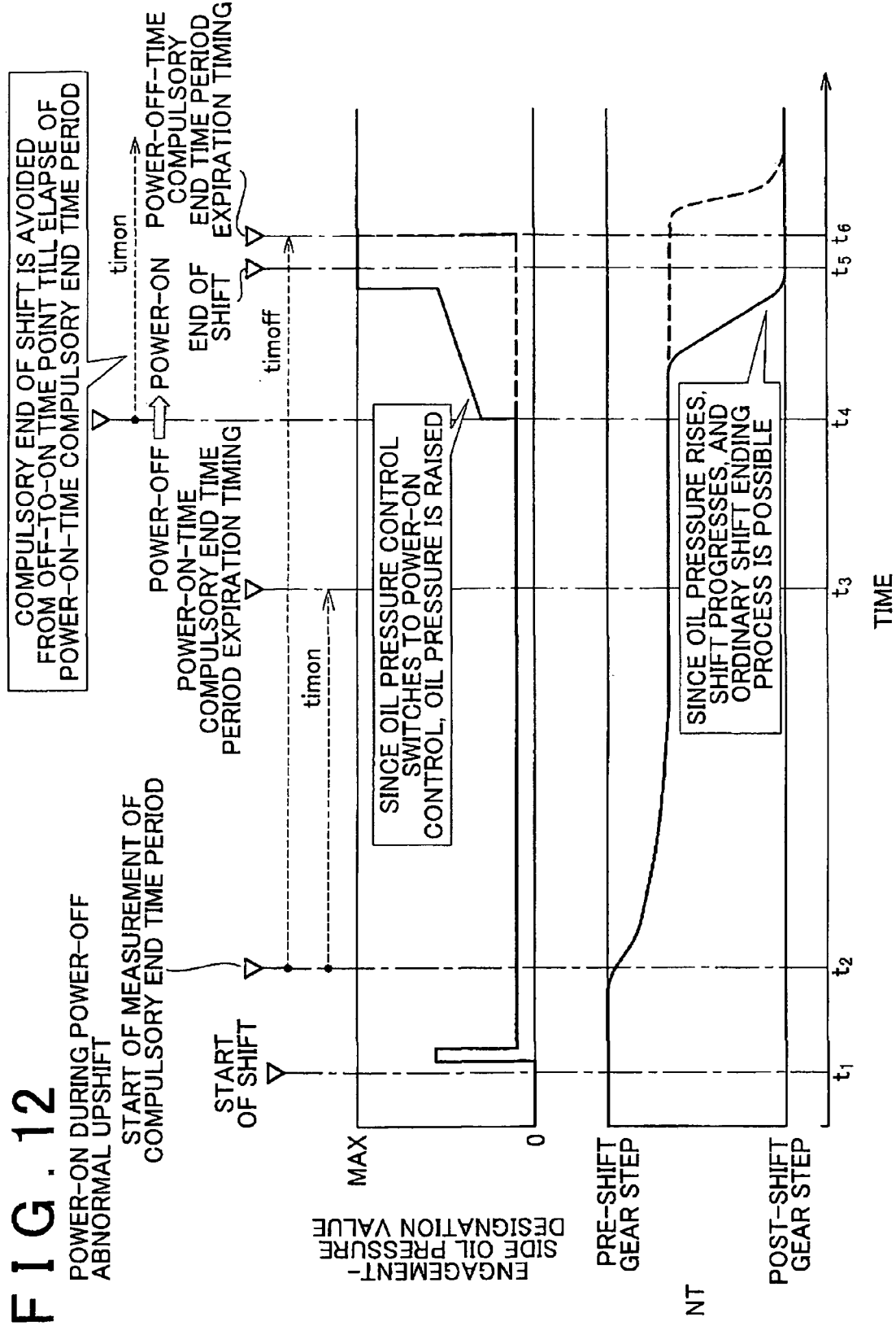

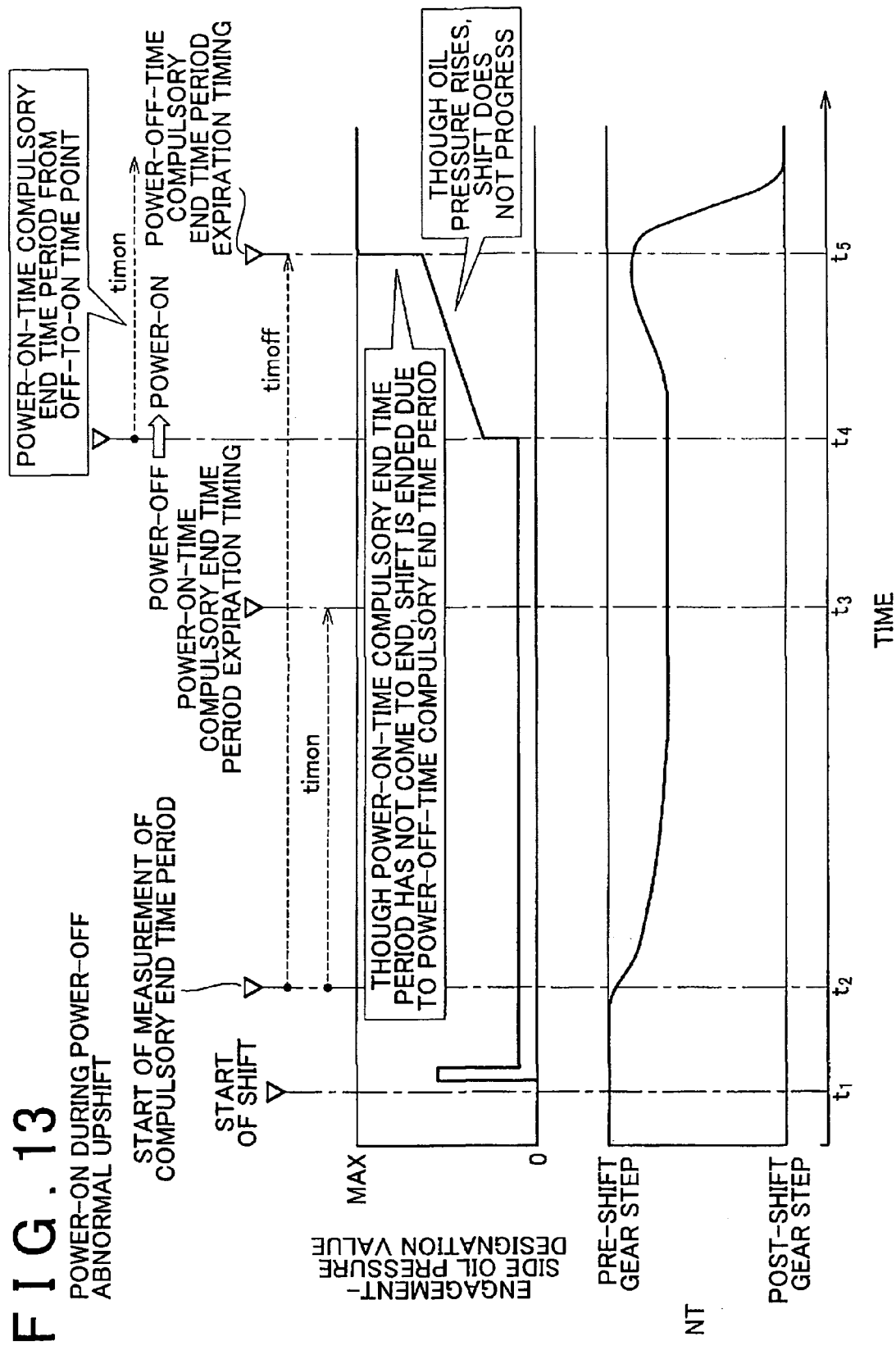

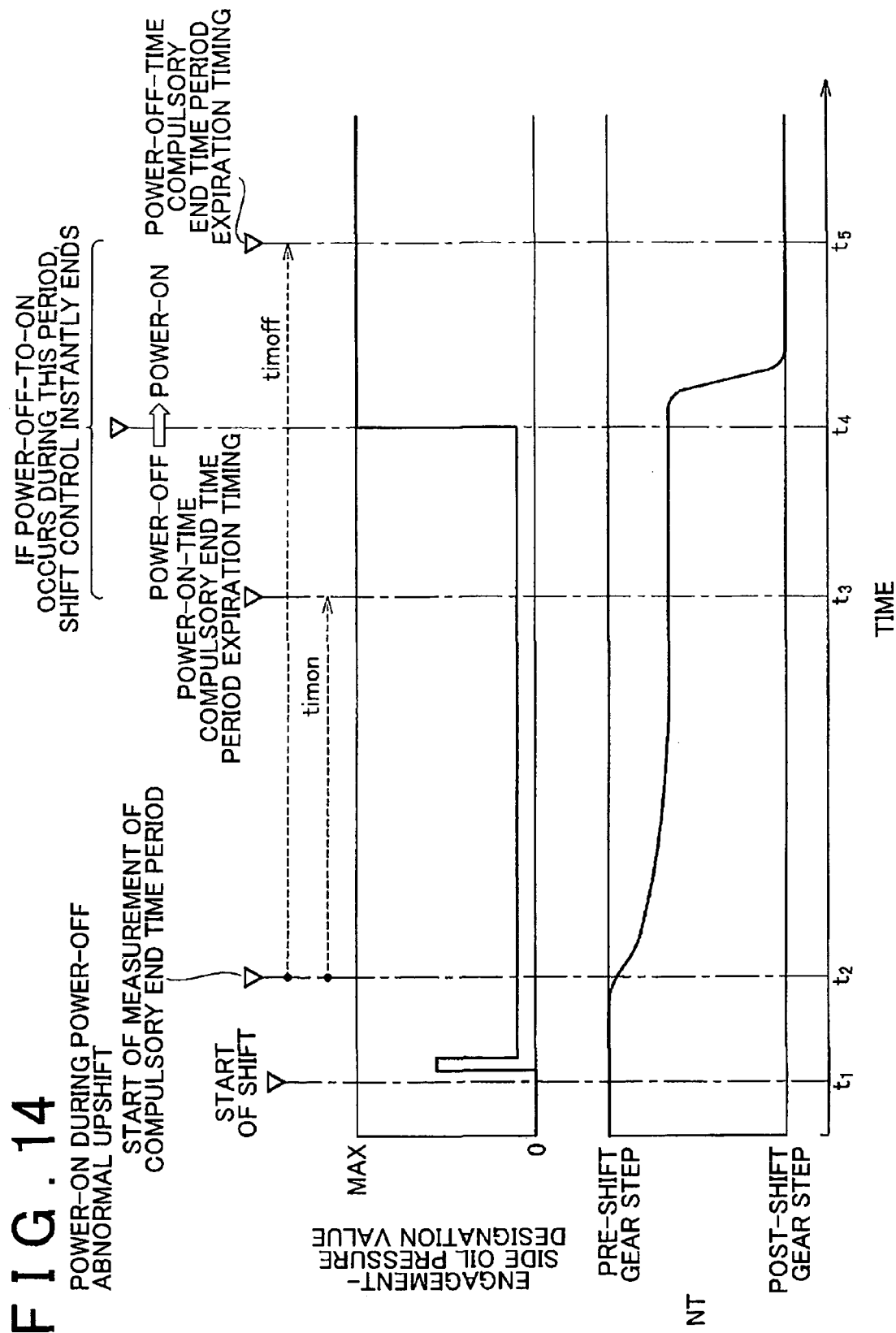

SHIFT CONTROL DEVICE AND SHIFT CONTROL METHOD OF AUTOMATIC TRANSMISSION

INCORPORATION BY REFERENCE

The disclosure of Japanese Patent Applications No. 2005-312037 filed on Oct. 26, 2005, including the specification, drawings and abstract is incorporated herein by reference in its entirety.

BACKGROUND OF THE INVENTION

1. Field of the Invention

The invention relates to a shift control device and a shift control method of an automatic transmission. In particular, the invention relates to a compulsory end timing period for compulsorily ending the shifting action through an oil pressure control or the like if the shift does not end.

2. Description of the Related Art

In a shift control device of an automatic transmission that establishes a plurality of gear steps of different speed change ratios by selectively engaging a plurality of friction engagement devices, it has been proposed that a shift start time point or an inertia start time point is defined as a reference time point, and that if a shift does not end although the elapsed time from the reference time point has exceeded a predetermined time, a post-shift state is attained by compulsorily ending a shifting action, for example, a change in the state of engagement of a friction engagement device, a change in the rotation speed of an input shaft, etc., through an oil pressure control or the like. An example of such a technology is described in Japanese Patent Application Laid-Open Publication No. 2002-89696, in which if a shift does not appropriately end due to an abnormality or the like, the compulsory ending of the shifting action will secure a durability of friction engagement devices, and will assure the end of the shift control.

Since the shift control of an automatic transmission (the pattern of change of the oil pressure control, etc.) is determined through synthetical consideration of responsiveness, shift shock, etc. as well as the durability of friction engagement devices, a shift-required time period in the case where the shift is properly performed varies depending on the vehicle drive state or the like. For example, in an upshift during a power-on state where the accelerator is turned on, the input shaft rotation speed that is apt to rise needs to be compulsorily declined by engaging a corresponding friction engagement device, and therefore the burden exerted on the friction engagement device is large. Hence, the shift control is performed so that the shift ends in a relatively short time. Whereas this shift-required time period is relatively short, the shift-required time period of an upshift during a power-off state where the accelerator is turned off is relatively long. In such an upshift, since a corresponding friction engagement device is engaged after the input shaft rotation speed has naturally declined due to engine friction and the like, the shifting action takes a relatively long time and, besides, the burden on the friction engagement device is small. Thus, the shift-required time period is generally shorter at the time of a power-on shift than at the time of a power-off shift.

It is desirable that the predetermined time period for compulsorily ending a shifting action be set on the basis of the aforementioned shift-required time period. It is also desirable that the predetermined time period for compulsorily ending a shifting action be set shorter at the time of a power-on shift than at the time of a power-off shift. However, in the case where a power-off shift is switched to a power-on shift due to the turning-on of the accelerator halfway through the power-off shift, the corresponding switching of the aforementioned predetermined time period may sometimes result in a shift shock or the like. Specifically, if, in that case, the predetermined time for the power-on shift has already expired at the time point of the switch to the power-on shift, the shifting action is immediately compulsorily ended with possible occurrence of a shift shock or the like, even in the case where the power-off shift was progressing properly, or in the case where although the shift during the power-off state was abnormal the shift control during the power-on state is to be properly performed.

SUMMARY OF THE INVENTION

The invention has been accomplished in view of the foregoing circumstances, and provides a shift control device and a shift control method of an automatic transmission capable of compulsorily ending a shifting action at an appropriate timing even if a power-off shift is switched to a power-on shift by turning on the accelerator halfway through the power-off shift.

Accordingly, there is provided a shift control device of an automatic transmission that establishes a plurality of gear steps of different speed change ratios by selectively engaging a plurality of friction engagement devices. This shift control device comprises a controller which uses one of a shift start time point and an inertia phase start time point as a reference time, and which, in a power-off shift, compulsorily ends a shift action when an elapsed time from the reference time exceeds a first time, and which, in a power-on shift, compulsorily ends the shift action when the elapsed time from the reference time exceeds a second time that is set shorter than the first time, and which, if a switch from the power-off shift to the power-on shift occurs halfway through the power-off shift, compulsorily ends the shift action when the elapsed time from a switch time point of the switch exceeds a predetermined time.

According to another aspect of the invention, there is provided a shift control method of an automatic transmission that establishes a plurality of gear steps of different speed change ratios by selectively engaging a plurality of friction engagement devices. This shift control method comprises:

using one of a shift start time point and an inertia phase start time point as a reference time, and compulsorily ending, in a power-off shift, a shift action when an elapsed time from the reference time exceeds a first time;

compulsorily ending, in a power-on shift, the shift action when the elapsed time from the reference time exceeds a second time that is set shorter than the first time; and compulsorily ending, if a switch from the power-off shift to the power-on shift occurs halfway through the power-off shift, the shift action when the elapsed time from a switch time point of the switch exceeds a predetermined time.

According to the shift control device and the shift control method of the automatic transmission described above, the shift action, in the power-off shift, is compulsorily ended when the elapsed time from the reference time exceeds the first time, and, in the power-on shift, the shift action is compulsorily ended when the elapsed time from the reference time exceeds the second time that is shorter than the first time. Therefore, the shift action is compulsorily ended appropriately so as to secure the durability of the friction engagement devices in accordance with whether the shift is a power-on shift or a power-off shift.

Besides, if a switch from the power-off shift to the power-on shift occurs halfway through the power-off shift, the shift action is compulsorily ended when the elapsed time from the time point of the switch exceeds the predetermined time. Therefore, the device and the method of the invention prevent the occurrence of a shift shock or the like caused by the shift action being compulsorily ended immediately at the time point of the switch to the power-on state in the case where the shift during the power-off state was properly progressing or the case where although the shift during the power-off state was abnormal the shift during the power-on state is to be properly performed. That is, the device and the method of the invention are able to appropriately perform the shift control of the power-on shift within the predetermined time from the time point of the switch. Besides, in that case, too, the shift action is compulsorily ended when the elapsed time from the switch time point exceeds the predetermined time. Therefore, the durability of the friction engagement devices is secured.

The invention is suitably applied to vehicular automatic transmissions, and can be applied to various automatic transmissions of vehicles, such as an engine drive vehicle in which driving power is generated by the combustion of a fuel, an electric motor vehicle that runs by an electric motor, etc. Examples of the automatic transmission to which the invention is applicable include various automatic transmissions that establish a plurality of gear steps in accordance with the states of actuation of a plurality of clutches and brakes, such as automatic transmissions of a planetary gear type, a parallel-axes type, etc.

As for the friction engagement devices, oil pressure type devices are suitably used. For example, by changing the oil pressure (engaging force) in a predetermined change pattern through an oil pressure control using solenoid valves or the like, or through the operation of an accumulator, etc., or by changing the oil pressure at a predetermined timing, the shift control is performed. However, other types of friction engagement devices, such as electromagnetic type devices and the like, may also be used. These friction engagement devices are, for example, single-plate type or multi-plate type clutches and brakes that are engaged by actuators, such as oil cylinders and the like, as well as belt-type brakes, etc.

The shift action can be compulsorily ended so as to establish a post-shift state, by completely engaging the concerned friction engagement device, for example, through an oil pressure control or the like, due to a change in the states of engagement of the friction engagement devices in association with the shift control, or a change in the rotation speed of the input shaft.

The reference time that serves as a basis for the timing of compulsorily ending the shift action may be either one of the shift start time point and the inertia phase start time point. However, since it is the amount of time following the start of the inertia phase that affects the durability of the friction engagement devices, it is desirable that the start time point of the inertia phase be the reference time. The shift start time point may be, for example, a time at which a shift command to change the engagement force (oil pressure or the like) of a friction engagement device is output, or a time at which the oil pressure actually begins to change. It is appropriate that the shift start time point be a constant timing that corresponds to the start of shift.

The power-off shift is an upshift or a downshift during a non-driving state, such as an accelerator-off state where the accelerator is not operated, or the like. The power-on shift is an upshift or a downshift during a driving state, such as an accelerator-on state where the accelerator is operated.

The invention is suitably applied to the case where the switching among gear steps is automatically performed in accordance with a predetermined shift condition (map or the like) that uses, as parameters, the vehicle speed, the throttle valve opening degree, and the like. Furthermore, the invention is also applicable to the cases where the switching based on manual operations is performed among a plurality of shift ranges with different ranges or numbers of gear steps that are subjected to the automatic shifting or among the gear steps themselves and the shift control is accordingly performed. Corresponding to whether the shift is automatic or manual, different amounts of time may be determined as the first time or the second time or the predetermined time from the switch time point.

BRIEF DESCRIPTION OF THE DRAWINGS

The features, advantages thereof and technical and industrial significance of this invention will be better understood by reading the following detailed description of preferred embodiments of the invention, when considered in connection with the accompanying drawings, in which:

FIG. 9 is a flowchart that concretely illustrates the content of a process of a shift control compulsorily ending device shown in FIG. 6;

FIG. 10A is an example of a time chart of the case where during a power-off upshift, a compulsorily ending control is performed in accordance with the flowchart of FIG. 9, and where a normal shift is performed;

FIG. 10B is an example of a time chart of the case where during a power-off upshift, the compulsorily ending control is performed in accordance with the flowchart of FIG. 9, and where there is a shift abnormality;

FIG. 11A is an example of a time chart of the case where during a power-on upshift, the compulsorily ending control is performed in accordance with the flowchart of FIG. 9, and where a normal shift is performed;

FIG. 12 is an example of a time chart of the case where halfway through the shift control of a power-off upshift the power-off state is switched to a power-on state, and then the compulsorily ending control is performed in accordance with the flowchart of FIG. 9, and where the power-on upshift is performed normally;

FIG. 13 is an example of a time chart of the case where halfway through the shift control of a power-off upshift the power-off state is switched to a power-on state, and then the compulsorily ending control is performed in accordance with the flowchart of FIG. 9, and where there is a shift abnormality; and FIG. 14 is an example of a time chart of the case where, when halfway through the shift control of a power-off upshift the power-off state is switched to the power-on state, the process of compulsorily ending the shift control is immediately performed.

DETAILED DESCRIPTION OF THE PREFERRED EMBODIMENTS

In the following description and the accompanying drawings, the present invention will be described in more detail with reference to exemplary embodiments.

Figures 1, 2:
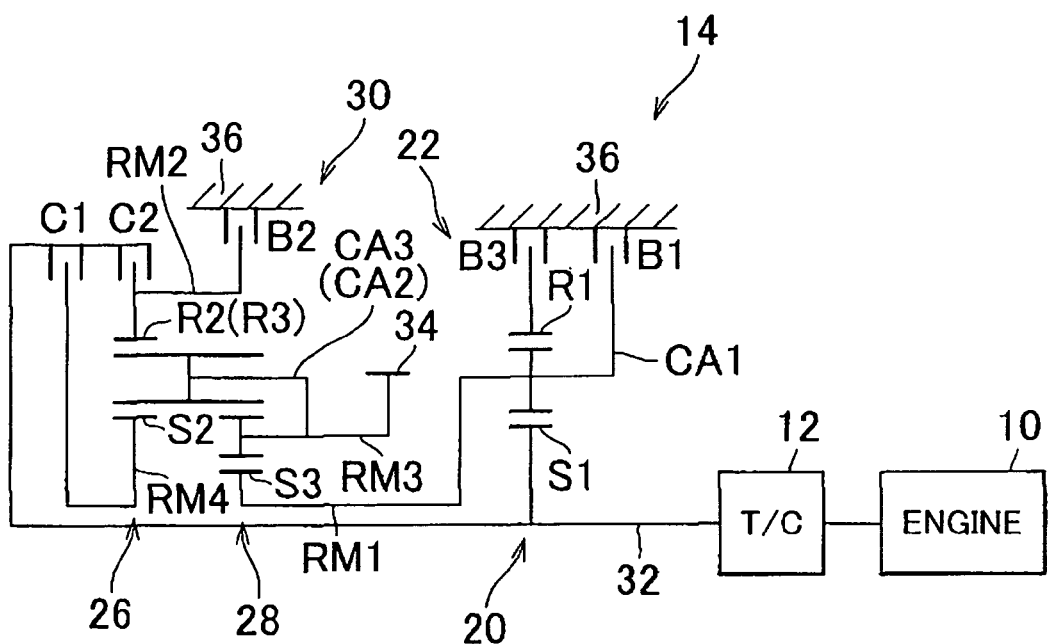
FIG. 1 is a skeleton diagram of a vehicular drive apparatus to which the invention is applied.
FIG. 2 is a diagram illustrating the engaged and released states of clutches and brakes for establishing various gear steps of an automatic transmission shown in FIG. 1.

FIG. 1 is a skeleton diagram of a transversely mounted type vehicular drive apparatus, such as an FF (front engine, front wheel drive) vehicle or the like, in which the output of an engine 10 constructed of an internal combustion engine, such as a gasoline engine or the like, is transferred to driving wheels (front wheels) via a torque converter 12, an automatic transmission 14, and a differential gear device (not shown). The engine 10 is a power source for running the vehicle, and the torque converter 12 is a coupling that employs a fluid.

The automatic transmission 14 has, on the same axis, a first speed change portion 22 constructed mainly of a single pinion-type first planetary gear device 20, and a second speed change portion 30 constructed mainly of a single pinion-type second planetary gear device 26 and a double pinion-type third planetary gear device 28. The automatic transmission 14 changes the rotation of an input shaft 32 in speed, and outputs it from an output gear 34. The input shaft 32 corresponds to an input member, and, in this embodiment, is a turbine shaft of a torque converter 12. The output gear 34 corresponds to an output member, and rotationally drives the left and right driving wheels via the differential gear device. Incidentally, the automatic transmission 14 is constructed substantially symmetrically about a center line. In FIG. 1, a half of the automatic transmission 14 below the center line is omitted.

The first planetary gear device 20 constituting the first speed change portion 22 has three rotating elements: a sun gear S1, a carrier CA1, and a ring gear R1. The sun gear S1 is coupled to the input shaft 32, and is rotationally driven thereby, and the ring gear R1 is unrotatably fixed to a case 36 via a third brake B3. In this manner, the carrier CA1 is rotated as an intermediate output member at reduced speed relative to the input shaft 32, and thus outputs reduced-speed rotation. The second planetary gear device 26 and the third planetary gear device 28 constituting the second speed change portion 30 are partly coupled to each other, and therefore have four rotating elements RM1 to RM4. Concretely, a sun gear S3 of the third planetary gear device 28 constitutes a first rotating element RM1. A ring gear R2 of the second planetary gear device 26 and a ring gear R3 of the third planetary gear device 28 are coupled to each other, and constitute a second rotating element RM2. A carrier CA2 of the second planetary gear device 26 and a carrier CA3 of the third planetary gear device 28 are coupled to each other, and constitute a third rotating element RM3. A sun gear S2 of the second planetary gear device 26 constitutes a fourth rotating element RM4. The second planetary gear device 26 and the third planetary gear device 28 are provided as a Ravigneaux type planetary gear train in which the carriers CA2 and CA3 are constructed by a common member, and the ring gears R2 and R3 are constructed by a common member, and pinion gears of the second planetary gear device 26 serve also as second pinion gears of the third planetary gear device 28.

The first rotating element RM1 (sun gear S3) is selectively coupled to the case 36 and therefore is stopped from rotating by a first brake B1. The second rotating element RM2 (ring gear R2, R3) is selectively coupled to the case 36 and therefore is stopped from rotating by a second brake B2. The fourth rotating element RM4 (sun gear S2) is selectively coupled to the input shaft 32 via a first clutch C1. The second rotating element RM2 (ring gear R2, R3) is selectively coupled to the input shaft 32 via a second clutch C2. The first rotating element RM1 (sun gear S3) is integrally coupled to the carrier CA1 of the first planetary gear device 20 which is the intermediate output member, and the third rotating element RM3 (carrier CA2, CA3) is integrally coupled to the output gear 34. In this manner, rotation is output from the output gear 34.

Each of the clutches C1, C2 and the brakes B1, B2, B3 (hereinafter, referred to simply as "clutch C" or "brake B" if not particularly distinguished) is a hydraulic friction engagement device, such as a multi-plate clutch, a band brake, etc., whose engagement is controlled by a hydraulic actuator. The clutches C1, C2 and the brakes B1, B2, B3 are switched between the engaged and released states as shown in FIG. 2 by a hydraulic circuit being switched through the excitation and deexcitation of linear solenoid valves SL1 to SL5 of an oil pressure control circuit 98 (see FIG. 3) or through the use of a manual valve (not shown). Thus, each of gear steps, that is, six forward-travel steps and one reverse-travel step, can be established in accordance with the operation position of a shift lever 72 (see FIG. 3). In FIG. 2, "1st" to "6th" mean the first to sixth speed forward-travel gear steps, and "Rev" means a reverse-travel gear step. The speed change ratios thereof (=input rotation speed NTN/output shaft rotation speed NOUT) are appropriately determined by the gear ratios $\rho 1$, $\rho 2$, $\rho 3$ of the first planetary gear device 20, the second planetary gear device 26 and the third planetary gear device 28. In FIG. 2, "◯" means engagement, and blanks mean release.

Figure 4:
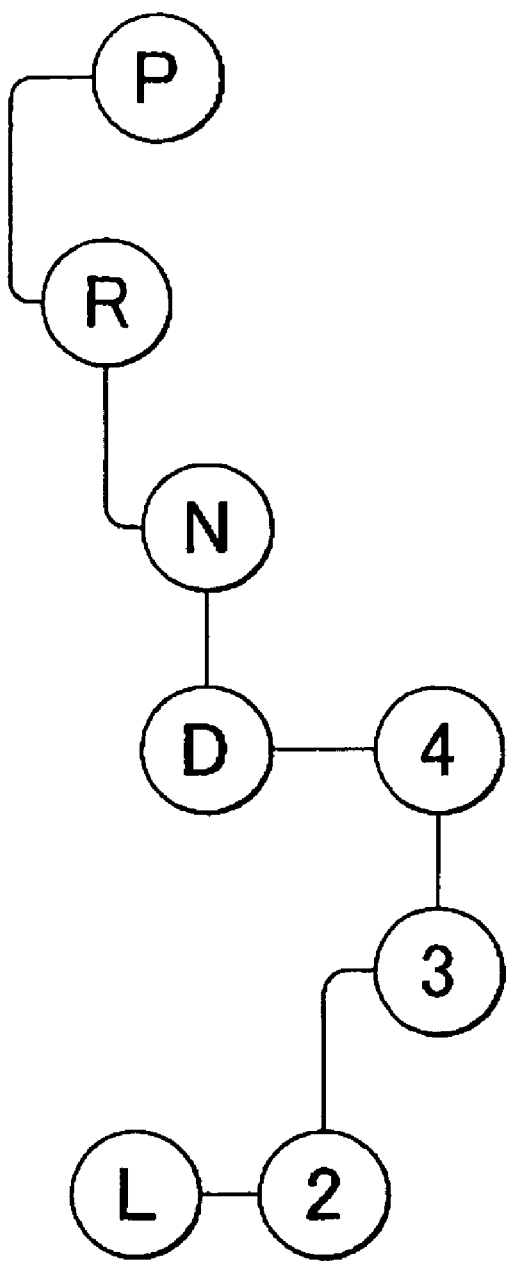
FIG. 4 is a diagram showing an example of a shift pattern of a shift lever shown in FIG. 3.

The shift lever 72 is designed to be operated, for example, to the parking position "P", the reverse drive position "R", the neutral position "N", and the forward drive positions "D", "4", "3", "2", "L" in accordance with the shift pattern shown in FIG. 4. At the "P" and "N" positions, a neutral state where the power transfer is cut off is established. However, at the "P" position, rotation of the driving wheels is mechanically prevented by a mechanical parking mechanism (not shown).

Figure 3:
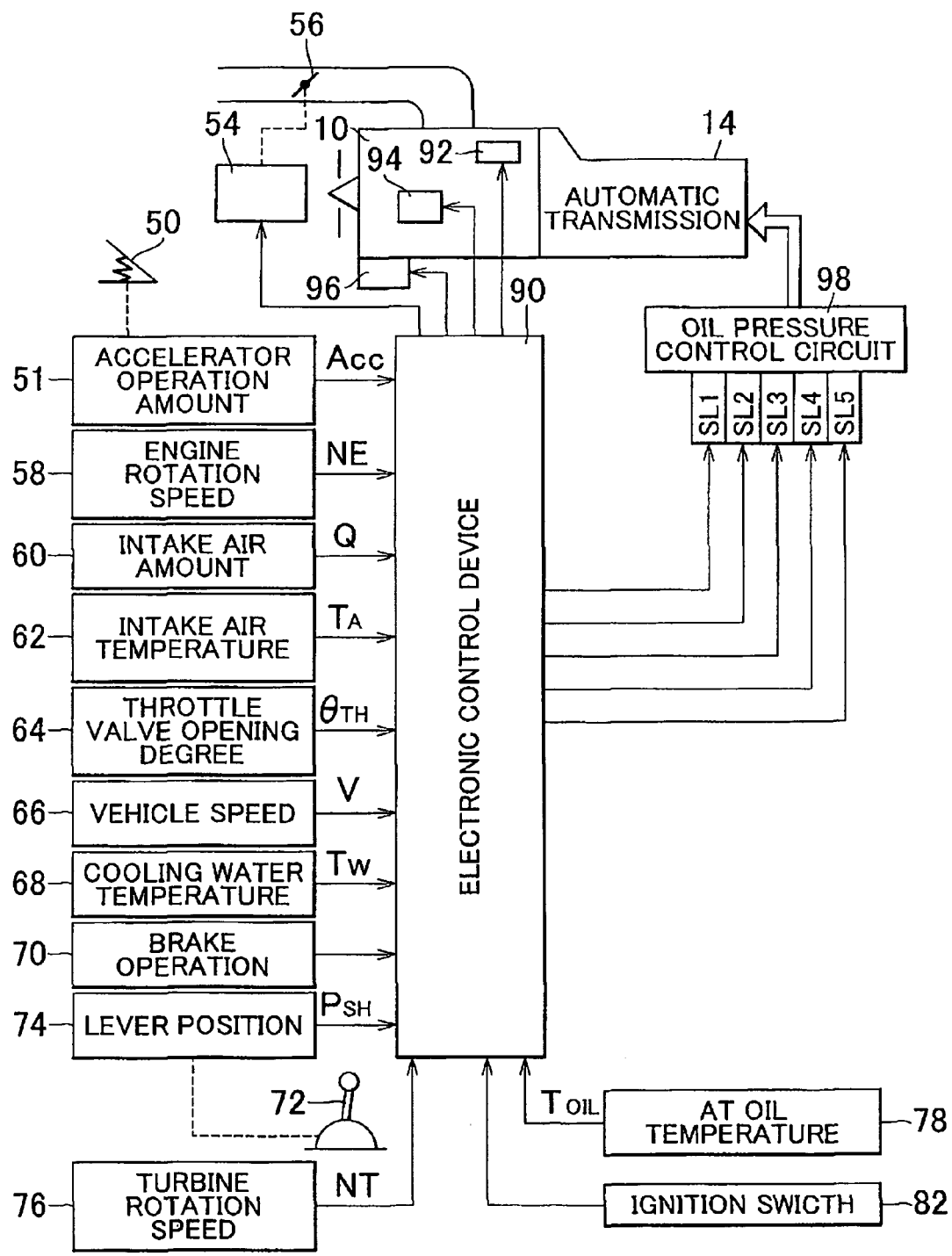
FIG. 3 is a diagram illustrating input/output signals with respect to an electronic control device provided in a vehicle of the embodiment shown in FIG. 1.

FIG. 3 is a block diagram illustrating a control system that is provided in a vehicle for controlling the engine 10 and the automatic transmission 14 shown in FIG. 1, and the like. In this control system, the amount of operation of an accelerator pedal 50 (accelerator operation amount) Acc is detected by an accelerator operation amount sensor 51. The accelerator pedal 50 is depressed to extents that are in accordance with the driver's output requirements. The accelerator pedal 50 corresponds to an accelerator-operating member, and the accelerator operation amount Acc corresponds to the output requirement. An intake piping of the engine 10 is provided with an electronic throttle valve 56 whose degree of opening $\theta_{TH}$ is changed by a throttle actuator 54. Further provided are an engine rotation speed sensor 58 for detecting the rotation speed NE of the engine 10, an intake air amount sensor 60 for detecting the intake air amount Q of the engine 10, an intake air temperature sensor 62 for detecting the temperature TA of intake air, an idle switch-equipped throttle sensor 64 for detecting the fully closed state (idle state) of the electronic throttle valve 56 and the degree of opening $\theta_{TH}$ thereof, a vehicle speed sensor 66 for detecting the rotation speed of the output gear 34 (corresponding to the output shaft rotation speed) NOUT that corresponds to the vehicle speed V, a cooling water temperature sensor 68 for detecting the cooling water temperature TW of the engine 10, a brake switch 70 for detecting the presence/absence of foot brake operation, a lever position sensor 74 for detecting the lever position (operation position) PSH of the shift lever 72, a turbine rotation speed sensor 76 for detecting the turbine rotation speed NT, an AT oil temperature sensor 78 for detecting the AT oil temperature TOIL that is the temperature of the working oil within the oil pressure control circuit 98, an ignition switch 82, etc. From these sensors, signals representing the engine rotation speed NE, the intake air amount Q, the intake air temperature TA, the throttle valve opening degree $\theta_{TH}$, the vehicle speed V (output shaft rotation speed NOUT), the engine cooling water temperature TW, the presence/absence of brake operation, the lever position PSH of the shift lever 72, the turbine rotation speed NT, the AT oil temperature TOIL, the operation position of the ignition switch 82, etc. are supplied to an electronic control device 90. The turbine rotation speed NT is the same as the rotation speed (input shaft rotation speed NIN) of the input shaft 32 that is an input member.

Figure 5:
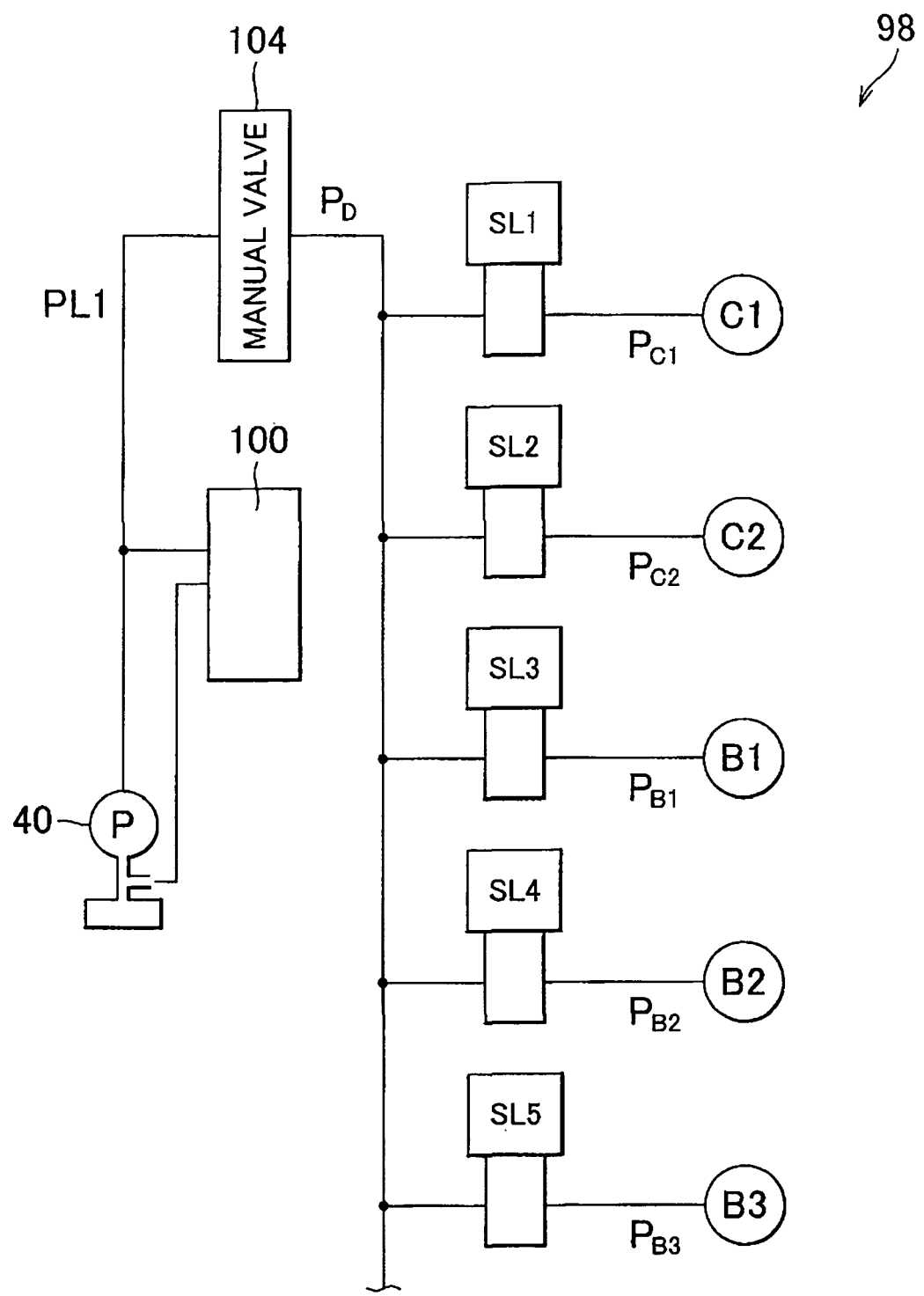
FIG. 5 is a circuit diagram illustrating the construction of a portion of an oil pressure control circuit shown in FIG. 3 which is related to the shift control of the automatic transmission.

The oil pressure control circuit 98 comprises a circuit shown in FIG. 5, in connection with the shift control of the automatic transmission 14. In FIG. 5, the working oil that is pressure-fed from an oil pump 40 is regulated in pressure by a relief-type first pressure regulator valve 100 so as to become a first line pressure PL1. The oil pump 40 is a mechanical pump that is rotationally driven by the engine 10. The first pressure regulating valve 100 regulates the first line pressure PL1 in accordance with the turbine torque TT, that is, the input torque TIN of the automatic transmission 14, or its substitute value, that is, the throttle valve opening degree $\theta_{TH}$. The first line pressure PL1 is supplied to a manual valve 104 that is operated in association with the shift lever 72. Then, if the shift lever 72 is at a forward travel drive position such as the "D" position or the like, a forward travel position pressure PD equal in magnitude to the first line pressure PL1 is supplied from the manual valve 104 to the linear solenoid valves SL1 to SL5. The linear solenoid valves SL1 to SL5 are provided corresponding to the clutches C1, C2 and the brakes B1 to B3, respectively. The states of excitation of the linear solenoid valves SL1 to SL5 are controlled in accordance with drive signals output by the electronic control device 90, and therefore, the engagement oil pressures PC1, PC2, PB1, PB2, PB3 of the clutches C1, C2 and the brakes B1 to B3 are controlled independently of each other. Thus, any one of the first speed gear step "1st" to the sixth speed gear step "6th" can be selectively established. Each of the linear solenoid valves SL1 to SL5 is of a large-capacity type, and the output oil pressure thereof is directly supplied to a corresponding one of the clutches C1, C2 and the brakes B1 to B3. Thus, a direct pressure control of directly controlling the engagement oil pressures PC1, PC2, PB1, PB2, PB3 is performed.

Figure 6:
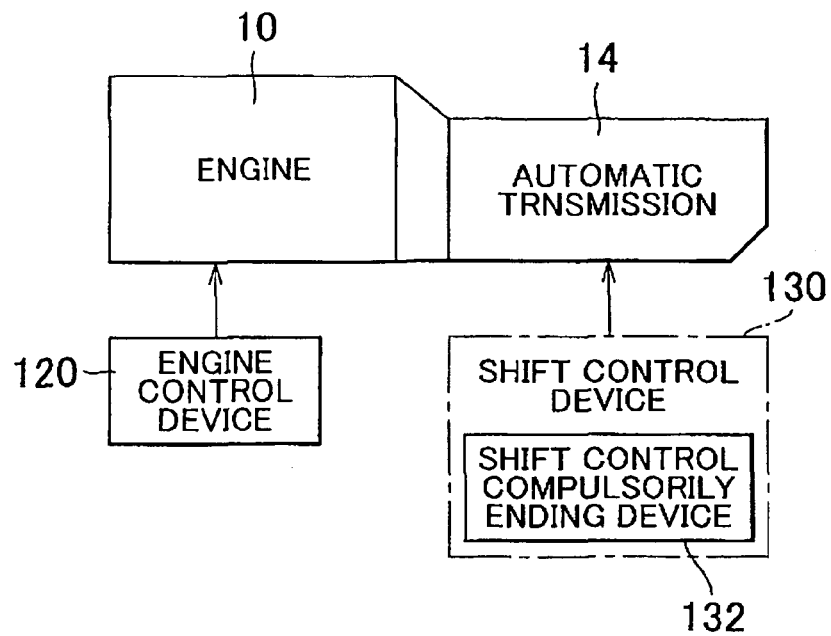
FIG. 6 is a block diagram illustrating functions that the electronic control device of FIG. 3 has.

The electronic control device 90 includes a so-called microcomputer that comprises a CPU, a RAM, a ROM, an input/output interface, etc. The CPU executes various functions of an engine control device 120 and a shift control device 130 as shown in FIG. 6 by performing signal processing in accordance with programs pre-stored in the ROM while utilizing the temporary storage function of the RAM. The electronic control device 90 is constructed so as to have separate portions for engine control and shift control if necessary.

Figure 7:
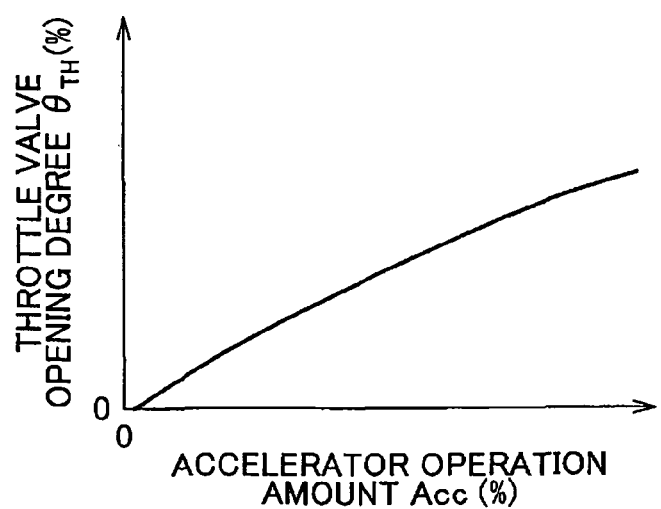
FIG. 7 is a diagram showing an example of a relationship between the accelerator operation amount Acc and the throttle valve opening degree $\theta_{TH}$ which is used in a throttle control performed by an engine control device shown in FIG. 6.

The engine control device 120 performs the output control of the engine 10. That is, the engine control device 120 controls the opening and closing of the electronic throttle valve 56 via the throttle actuator 54, and controls the fuel injection valve 92 for the fuel injection amount control, and controls an ignition device 94, such as an igniter or the liker, for the ignition timing control. As for the control of the electronic throttle valve 56, for example, the throttle actuator 54 is driven on the basis of the actual accelerator operation amount Acc from a relationship shown in FIG. 7, and the throttle valve opening degree $\theta_{TH}$ is increased with increases in the accelerator operation amount Acc. Besides, at the time of starting the engine 10, cranking is performed by a starter (electric motor) 96.

Figure 8:
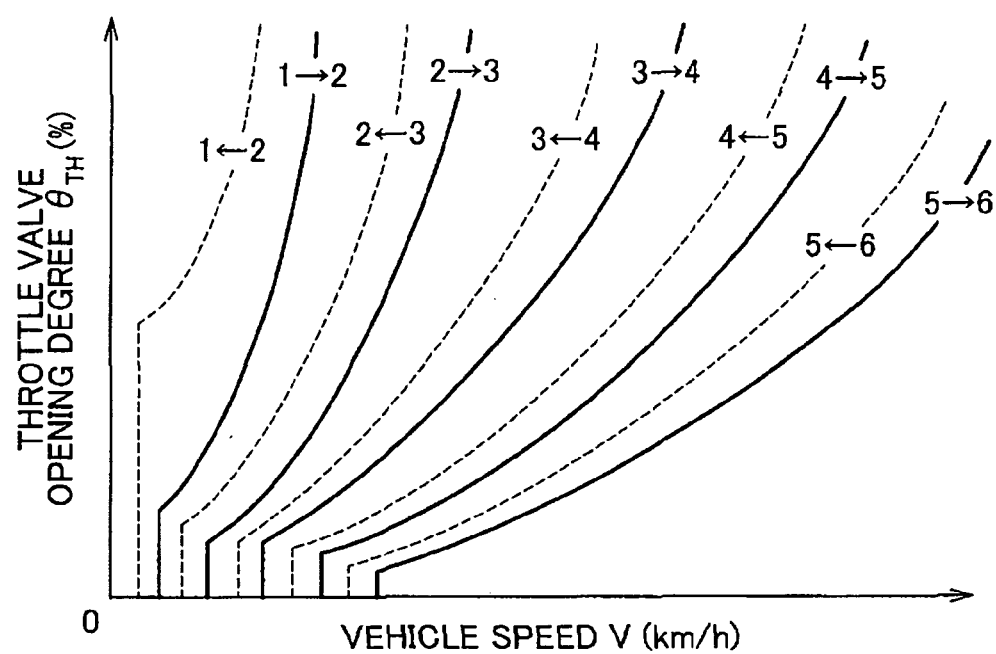
FIG. 8 is a diagram showing an example of a shift graph (map) used in the shift control of the automatic transmission performed by a shift control device shown in FIG. 6.

The shift control device 130 performs the shift control of the automatic transmission 14. For example, on the basis of the actual throttle valve opening degree $\theta_{TH}$ and the vehicle speed V from a pre-stored shift chart (shift map) shown in FIG. 8, a gear step to which the automatic transmission 14 (i.e., a post-shift gear step) needs to shift is determined, that is, judgment regarding a shift from the present gear step to a shift-target gear step is executed, and the output of a shift signal for starting a shift action for the determined gear step is accomplished, and the states of excitation of the linear solenoid valves SL1 to SL5 of the oil pressure control circuit 98 are continuously changed so that a shift shock, such as a driving power change or the like, will not occur and the durability of a friction member of the clutches C or the brakes B will not degrade. As is apparent from FIG. 2, the automatic transmission 14 of this embodiment is designed to perform the shift between consecutive gear steps by a clutch-to-clutch shift in which one of the clutches C and the brakes B is released and another one of them is engaged. In FIG. 8, solid lines are upshift lines, and broken lines are downshift lines. As the vehicle speed V becomes lower, or as the throttle valve opening degree $\theta_{TH}$ becomes larger, the gear step is switched to a lower-speed side gear step that has a larger speed change ratio. In FIG. 8, numerals "1" to "6" mean the first speed gear step "1st" to the sixth speed gear step "6th", respectively.

When the shift lever 72 is operated to the "D" position, a most significant D range (automatic shift mode) in which shifting is automatically performed among all the forward travel gear steps "1st" to "6th" is established. If the shift lever 72 is operated to one of the "4" to "L" positions, a corresponding one of 4, 3, 2 and L shift range is established. In the 4 range, the shift control is performed among the fourth speed gear step "4th" and the lower forward travel gear steps. In the 3 range, the shift control is performed among the third speed gear step "3rd" and the lower forward travel gear steps. In the second range, the shift control is performed among the second sped gear step "2nd" and the lower forward travel gear step. In the L range, the gear step is fixed to the first speed gear step "1st". Therefore, for example, if during a run with the sixth speed gear step "6th" in the D range, the shift lever 72 is operated from the "D" position to the "4" position, the "3" position, and then the "2" position, the shift range is switched in the sequence of D→4→3→2, with the gear step being compulsorily shifted down from the sixth speed gear step "6th" to the fourth speed gear step "4th", the third speed gear step "3rd", and then the second speed gear step "2nd". Thus, the gear step can be altered through manual operations.

The shift control of the automatic transmission 14 on an automatic or manual basis as described above is performed by changing the engagement-side oil pressure and/or the release-side oil pressure in accordance with a change pattern determined beforehand or changing the engagement-side oil pressure and/or the release-side oil pressure at predetermined change timing. The fashion of controlling the change pattern, the change timing, etc. is determined in accordance with the vehicle driving state and the like, through synthetical consideration of the durability and the shift responsiveness of the clutches C and the brakes B, the shift shock, etc. Therefore, the shift-required time period in the case where shift is properly performed varies depending on the control fashion thereof, the state of the vehicle such as the vehicle speed V and the like, etc. Concretely, in an upshift during a power-on state (driving state) where the accelerator pedal 50 is depressed, the turbine rotation speed NT that is apt to rise needs to be compulsorily declined by engaging a clutch C or a brake B, and therefore the burden exerted on the clutch C or the brake B is large. Hence, the shift control is performed so that the shift ends in a relatively short time. Thus, the shift-required time period is relatively short. On the other hand, in an upshift during a power-off state (driven state) where the accelerator pedal 50 is not depressed, a clutch C or a brake B is engaged after the turbine rotation speed NT has naturally declined due to the friction of the engine 10 and the like, and therefore the shifting action takes a relatively long time and, besides, the burden exerted on the clutch C or the brake B is small, and the shift-required time period is relatively long. Thus, the shift-required time period is generally shorter at the time of a power-on shift than at the time of a power-off shift.

FIG. 10A is a time chart showing an example fashion of changes in the engagement-side oil pressure designation value and the turbine rotation speed NT in the case where an upshift during the power-off state is performed normally. FIG. 11A is a time chart showing an example fashion of changes in the engagement-side oil pressure designation value and the turbine rotation speed NT in the case where an upshift during the power-on state is performed normally. The shift-required time period from an inertia phase start time point (time t2) to the end of shift (time t3) which affects the durability of the clutches C and the brakes B is longer in the power-off upshift than in the power-on upshift. Incidentally, in the section of the turbine rotation speed NT in the drawing, the "PRE-SHIFT GEAR STEP" represents the synchronous rotation speed in the pre-shift gear step, and the "POST-SHIFT GEAR STEP" represents the synchronous rotation speed in the post-shift gear step. Each synchronous rotation speed is found by multiplying the speed change ratio of a corresponding gear step and the output shaft rotation speed NOUT. Then, if the turbine rotation speed NT is equal to the synchronous rotation speed of a gear step concerned, the gear step is established. However, if the turbine rotation speed NT is not equal to the synchronous rotation speed of a gear step concerned, the shifting is in progress. Besides, the engagement-side oil pressure designation value corresponds to the exciting current to the linear solenoid valves SL1 to SL5, and the actual oil pressure changes with a delay from the designation value.

Figure 11B:
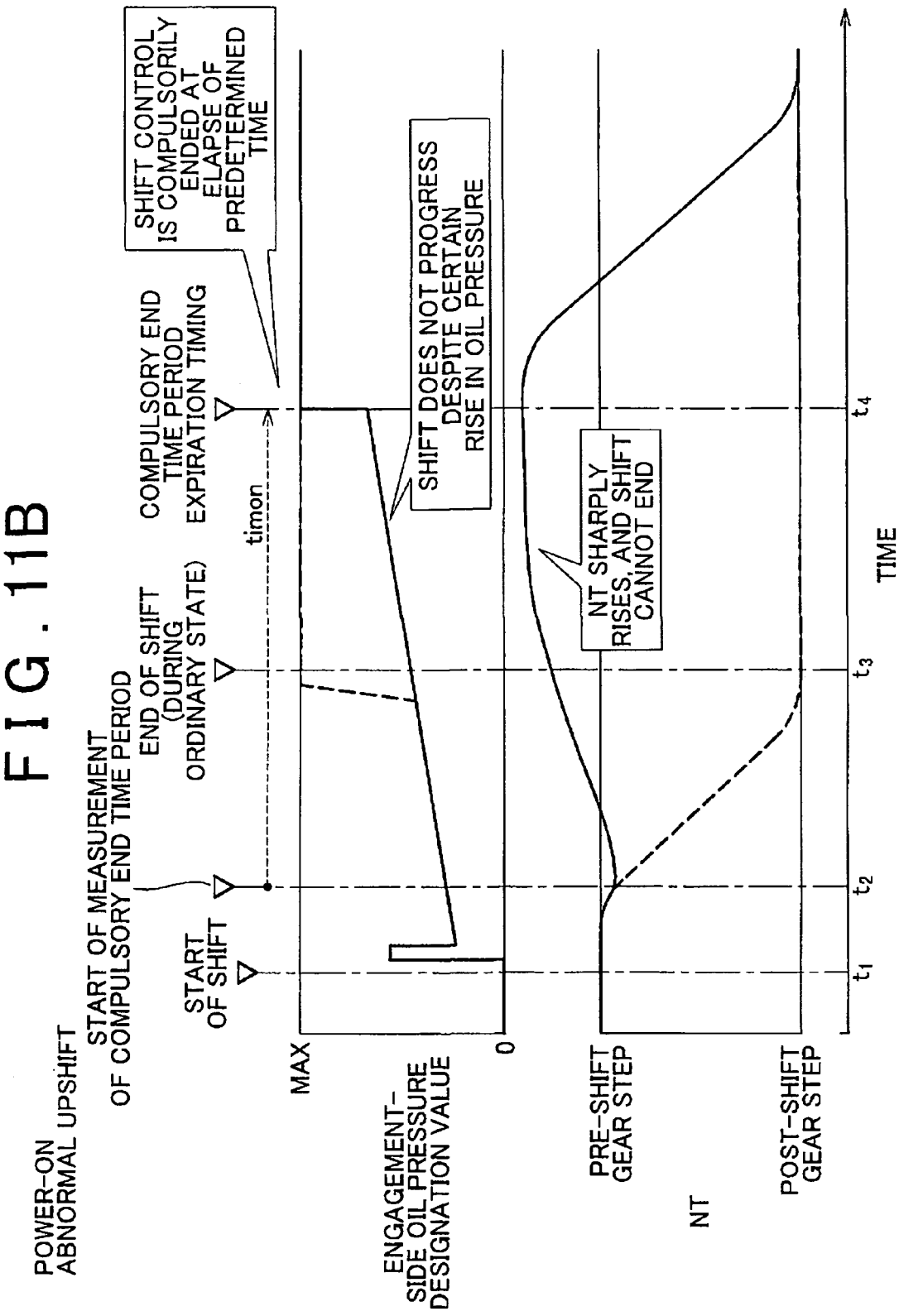
FIG. 11B is an example of a time chart of the case where during a power-on upshift, the compulsorily ending control is performed in accordance with the flowchart of FIG. 9, and where there is a shift abnormality.

The shift control device 130 of this embodiment has a shift control compulsorily ending device 132 that compulsorily ends the shift action by switching the oil pressure so that the clutches C and the brakes B assume the post-shift states of engagement if due to an abnormality, the shift action, that is, the action in which the states of engagement of the clutches C and the brake B change or the turbine rotation speed NT changes in connection with the shift control, does not appropriately end. FIG. 9 is a flowchart illustrating a concrete content of signal processing executed by the shift control compulsorily ending device 132. FIGS. 10B, 11B and 13 are time charts showing some examples of the case where the compulsorily ending process for the shift control is executed in accordance with the flowchart of FIG. 9. Besides, FIG. 12 is a time chart showing an example of the case where when a power-off upshift is switched to a power-on shift halfway through the power-off shift, the compulsorily ending control is performed in accordance with the flowchart of FIG. 9, and the shift ends normally before the compulsorily ending process is actually performed. FIG. 14 is a time chart of the case where the shift control is compulsorily ended at the time point (time t4) of the switch to the power-on state in FIG. 12.

In step S1 in FIG. 9, it is judged whether a shift control for switching the engaged/released states of the clutches C and the brakes B has been started following a judgment that a shift should be performed automatically in accordance with the shift map of FIG. 8 or in connection with a manual operation of the shift lever 74, for example, from the states of output of the exciting current to the linear solenoid valves SL1 to SL5, that is, the oil pressure designation values or the like. If the shift control has been started, the process of step S2 and the following steps is executed. The time t1 in FIGS. 10A to 14 is a time point when the shift control is started, that is, a time point when the judgment in step S1 is "YES".

In step S2, it is judged whether or not the shift has ended from the states of output of the exciting current to the linear solenoid valves SL1 to SL5 as in step S1. If the shift has ended, the series process of the compulsorily ending control by the shift control compulsorily ending device 132 is ended. If the shift has not ended, the step S3 and the following steps are executed. In step S3, it is judged whether or not the power-off state is present on the basis of the on or off-state of the idle switch or the like. If the power-off state is present, step S4 is executed. If the power-off state is not present, step S5 and the following steps are executed.

In step S4, it is judged whether or not a compulsory end time period timoff for the power-off state has passed. The process of step S2 and the following steps is repeated until the compulsory end time period timoff comes to an end. When the compulsory end time period timoff comes to an end, step 9 is executed, that is, the compulsorily ending process of the shift action is carried out. The compulsory end time period timoff for the power-off state corresponds to a first time, which is set at a time (e.g., a time of t2 to t4 in FIG. 10) that is sufficiently longer than the shift-required time period (e.g., a time of t2 to t3 in FIG. 10), in accordance with the kind of shift, that is, whether the shift is an upshift or a downshift, or from which gear step to which gear step the shift is, etc. The states of the vehicle, such as the vehicle speed V, the AT oil temperature TOIL, etc., can be used as parameters for finer setting. In this embodiment, the time t2 of start of the inertia phase is used as a reference time, and the compulsorily ending process is performed by judging whether or not the elapsed time from the reference time has reached the compulsory end time period timoff. On the basis of the judgment, the compulsory end time period timoff is performed.

FIG. 10B shows a case where, due to an abnormality, the power-off shift does not end before the elapsed time reaches the compulsory end time period timoff. In this case, at the time point (time t4) when the elapsed time reaches the compulsory end time period timoff, the engagement-side oil pressure designation value is raised to a MAX pressure (first line pressure PL1). The cause of the abnormality is, for example, a delay in the decline of the turbine rotation speed NT due to bad drain of the oil pressure from the release-side clutch C or brake B or the like, a failure of the turbine rotation speed sensor 76, etc. However, since the engagement-side oil pressure designation value is raised to the MAX pressure as described above, the engagement-side clutch C or brake B is promptly engaged completely. Thus, the shift action is compulsorily ended, establishing the post-shift gear step. Incidentally, the graph represented by a broken line in FIG. 10B is a graph for the case where the shift is performed normally, and is the same as the graph in FIG. 10A.

If the power-on state is present and therefore the judgment in step S3 is "NO" (negative), step S5 is executed, that is, it is judged whether or not there is a history of the power-off state following the start of the shift control. Specifically, if the power-off state is present and the judgment in step S3 is "YES" (affirmative), the presence of the power-off state is stored, for example, by switching a power-off history flag or the like. If it is judged that there is no history of the power-off state, that is, if the power-on state has continued from the very start of the shift control, step S6 is executed. In step S6, it is judged whether or not a compulsory end time period timon for the power-on state has elapsed. The process of step S2 and the following steps is repeatedly executed until the compulsory end time period timon comes to an end. Once the compulsory end time period timon comes to an end, a compulsorily ending process for the shift control is carried out in step S9. The compulsory end time period timon for the power-on state corresponds to a second time, which is set at a time (e.g., a time of t2 to t4 in FIGS. 11A and 11B) that is sufficiently longer than the shift-required time period (e.g., a time of t2 to t3 in FIGS. 11A and 11B), on the basis of the shift-required time period, by using as parameters the kind of shift, that is, whether the shift is an upshift or a downshift, or from which gear step to which gear step the shift is, the vehicle speed V, the input torque (throttle valve opening degree $\theta_{TH}$, or the like), the AT oil temperature TOIL, etc. This compulsory end time period timon for the power-on state is sufficiently shorter than the compulsory end time period timoff for the power-off state. Besides, the compulsory end time period timon for the power-on state is also determined by using as a reference time the time t2 at which the inertia phase is started.

FIG. 11B shows a case where, due to an abnormality, the power-on upshift does not end before the compulsory end time period timon comes to an end. In this case, at the time point (time t4) when the compulsory end time period timon expires, the engagement-side oil pressure designation value is raised to the MAX pressure (first line pressure PL1). The cause of the abnormality is, for example, a sharp rise in the turbine rotation speed NT due to excessively early release timing of the engagement-side clutch C or brake B or delayed supply of the working oil to the engagement-side clutch C or brake B, a failure of the turbine rotation speed sensor 76, etc. However, since the engagement-side oil pressure designation value is raised to the MAX pressure as described above, the engagement-side clutch C or brake B is promptly engaged completely. Thus, the shift action is compulsorily ended, establishing the post-shift gear step. Incidentally, the graph represented by a broken line in FIG. 11B is a graph for the case where the shift is performed normally, and is the same as the graph in FIG. 11A.

If the judgment in step S5 is "YES" (affirmative), that is, if the power-off state was present at a time after the start of the shift control although the power-on state is present at the present time point, step S7 is executed. In step S7, it is judged whether or not the elapsed time from the reference time (time t2) has exceeded the compulsory end time period timoff for the power-off state, as in step S4. Until the elapsed time reaches the compulsory end time period timoff for the power-off state, step S8 is executed. In step S8, it is judged whether or not the compulsory end time period timon for the power-on state has elapsed. Until the elapsed time reaches the compulsory end time period timon, the process of step S2 and the following steps is repeatedly executed. Once the compulsory end time period timon has elapsed, the compulsorily ending process for the shift control is carried out in step S9. This compulsory end time period timon for the power-on state is the same amount of time as that used to execute step S6. However, in step S8, the judgment is made on the basis of the elapsed time measured from the switch time point of the switch from the power-on state to the power-off state (time t4 in FIGS. 12 to 14) which is used as a reference point. The compulsory end time period timon in this case corresponds to a predetermined time in claim 1.

FIG. 12 shows a case where an upshift during the power-off state is abnormal, and the compulsory end time period timon for the power-on state elapses without an end of the shift, and after that, the power-off state is switched to the power-on state due to depression of the accelerator pedal 50. In this case, the engagement-side oil pressure designation value is immediately switched to a control fashion for the power-on state, that is, the oil pressure control pattern for the power-on upshift. In that case, the compulsorily ending control is performed on the basis of the elapsed time from the switch time point (time t4). Therefore, if the upshift during the power-on state normally progresses, the shift ends before the elapsed time reaches the compulsory end time period timon for the power-on state. In FIG. 12, the time t5 is a time at which the power-on upshift normally ends as described above.

In contrast, FIG. 14 shows a case where when the power-off state is switched to the power-on state, the compulsorily ending control for the power-on state that uses the inertia phase start time point (time t2) as a reference is executed without a change. Since the compulsory end time period timon for the power-on state is exceeded already at the switch time point (time t4), the compulsorily ending process is immediately performed even if the power-on shift is to be properly performed as in FIG. 12. Thus, as the engagement-side oil pressure designation value is raised to the MAX pressure, a shift shock due to a rapid engagement occurs.

FIG. 12 illustrates the case where as an upshift during the power-off state is abnormal, and the compulsory end time period timon for the power-on state elapses without an end of the shift, and then the power-off state is switched to the power-on state due to depression of the accelerator pedal 50. However, in the case where power-off state is switched to the power-on state before the time t3 at which the compulsory end time period timon for the power-on state expires is reached, too, it is judged whether or not the elapsed time from the time point of the switch has reached the compulsory end time period timon for the power-on state. Depending on the judgment, the compulsorily ending control is performed. This prevents occurrence of a shift shock caused by the compulsorily ending process being immediately performed at the time point (time t3) at which the end of the compulsory end time period timon for the power-on state with reference to the inertia phase start time point (time t2) is reached although the shift control for the power-off state and the shift control for the power-on state are properly performed.

The graph represented by a broken line in FIG. 12 represents a case where while the power-off state has continued, the compulsory end time period timoff for the power-off state comes to an end and the judgment in step S4 becomes "YES" (affirmative), so that the compulsorily ending process of step S9 is performed. The graph is the same as the one represented by the solid line in FIG. 10B. If the state is switched from the power-off state to the power-on state halfway through the power-off state, and then is switched again to the power-off state, step S3 is followed by the execution of step S4. Thus, depending on whether the compulsory end time period timoff for the power-off state has elapsed from the inertia phase start time point (time t2) as a reference, the compulsorily ending control is performed.

If the judgment in step S7 is "YES" (affirmative), that is, if the compulsory end time period timoff for the power-off state from the inertia phase start time point (time t2) as a reference comes to an end before the elapsed time from the switch time point (time t4 in FIGS. 12 to 14) reaches the compulsory end time period timon for the power-on state, step S9 is executed, that is, the compulsorily ending process is executed. Specifically, as shown in FIG. 13, if the upshift during the power-on state is also not properly performed due to an abnormality, and the compulsory end time period timoff for the power-off state comes to an end without the end of the shift, the engagement-side oil pressure designation value is raised to the MAX pressure to immediately completely engage the engagement-side clutch C or brake B. In this manner, the durability of the friction engagement devices and the like is secured. Besides, if the depressing operation of the accelerator pedal 50 is performed on and off though the upshift during the power-on state is properly performed, there is a possibility that the fashion of the shift control of the upshift will be repeatedly switched. Furthermore, in step S8, every time the state is switched from the power-off state to the power-on state, it will be judged whether the compulsory end time period timon for the power-on state from the new switch time point as a reference has comes to an end. Thus, there is a possibility that the shift time will become long and the durability of the clutches C and the brakes B will degrade. However, the provision of step S7 limits the longest time of the shift control to the compulsory end time period timoff, and therefore prevents such deterioration of the durability. Thus, since the shift control is compulsorily ended with reference to the compulsory end time period timoff for the power-off state defined as the longest time of the shift control, the compulsory end time period timoff is set not at an ordinary shift-required time period for the power-off state, but at a relatively long time within such a range that the durability of the clutches C and the brakes B will not be degraded, by assuming patterns that can be conceived to occur in ordinary drivers' operations, for example, such a range that the number of repetitions of the power-on state and the power-off state is less than or equal to a predetermined number of times. Incidentally, in FIG. 13, if the compulsory end time period timon for the power-on state from the switch time point (time t4) as a reference comes to an end prior to time t5 at which the compulsory end time period timoff for the power-off state from the inertia phase start time point (time t2) as a reference expires, the judgment in step S8 instantly becomes "YES" (affirmative), so that the compulsorily ending process of step S9 is performed.

In this manner, the shift control compulsorily ending device 132 of this embodiment compulsorily ends the shift action in the power-off shift if the elapsed time from the inertia phase start time point (time t2 in FIGS. 10A and 10B) exceeds the compulsory end time period timoff. In the power-on shift, the shift control compulsorily ending device 132 compulsorily ends the shift action if the elapsed time from the inertia phase start time point (time t2 in FIG. 11) exceeds the compulsory end time period timon. Therefore, in accordance with whether the shift is the power-on shift or the power-off shift, the shift action is compulsorily ended appropriately so that the durability of the clutches C and the brakes B is secured.

If, as shown in FIG. 12, the power-off shift is switched to the power-on shift halfway through the power-off shift, the shift action is compulsorily ended when the elapsed time from the time point t4 of that switch exceeds the compulsory end time period timon. Therefore, the shift control device of this embodiment prevents the occurrence of a shift shock or the like caused by, for example, as shown in FIG. 14, the shift action being compulsorily ended immediately at the time point (time t4) of the switch to the power-on state in the case where the shift during the power-off state was properly progressing or the case where although the shift during the power-off state was abnormal the shift during the power-on state is to be properly performed. That is, the shift control device is able to appropriately perform the shift control of the power-on shift before the elapsed time from the switch time point t4 reaches the compulsory end time period timon. Besides, in that case, too, the shift action is compulsorily ended if the elapsed time from the switch time point t4 exceeds the compulsory end time period timon. Therefore, the durability of the clutches C and the brakes B is secured.

Besides, in the embodiment, the compulsory end time period timon for the power-on state is directly used as a predetermined time that is allowed to elapse from the time point of the switch from the power-off state to the power-on state (time t4 in FIGS. 12 and 13) before the shift action is compulsorily ended. Therefore, as in the case where a power-on shift has continued from the beginning, the shift action is ended within the compulsory end time period timon in an ordinary case (normal shift). At the time of a shift abnormality, the shift action is compulsorily ended appropriately so that the durability of the clutches C and the brakes B is secured.

Besides, in the embodiment, even while the elapsed time from the time point (time t4 in FIGS. 12 and 13) of the switch from the power-off state to the power-on state is within the compulsory end time period timon, the shift action is compulsorily ended if the elapsed time from the inertia phase start time point t2 exceeds the compulsory end time period timoff for the power-off state. Therefore, for example, even in the case where the switching between a power-on shift and a power-off shift is repeated due to on-and-off operations of the accelerator pedal 50 and the switch time point is newly set every time of the switching, the device of the embodiment is able to reliably assure the end of the shift control while securing the durability of the clutches C and the brakes B since the longest time of the shift control is limited to the compulsory end time period timoff for the power-off state. Hence, the signal processing by the electronic control device 90 can proceed forward, so that the load is reduced. Besides, other effects can be achieved. For example, multiple shifting is restrained; a learning control becomes possible; etc.

While the embodiment of the invention has been described in detail above with reference to the drawings, it is a mere embodiment, and the invention can be carried out in various fashions with modifications and improvements on the basis of the knowledge of those of ordinary skill in the art.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A shift control device of an automatic transmission that establishes a plurality of gear steps of different speed change ratios by selectively engaging a plurality of friction engagement devices, comprising:

a controller which uses one of a shift start time point and an inertia phase start time point as a reference time, and which, in a power-off shift, compulsorily ends a shift action when an elapsed time from the reference time exceeds a first time, and which, in a power-on shift, compulsorily ends the shift action when the elapsed time from the reference time exceeds a second time that is set shorter than the first time, and which, if a switch from the power-off shift to the power-on shift occurs halfway through the power-off shift, compulsorily ends the shift action when the elapsed time from a switch time point of the switch exceeds a predetermined time.

2. The shift control device of the automatic transmission according to claim 1, wherein the predetermined time is the second time.

3. The shift control device of the automatic transmission according to claim 1, wherein the controller compulsorily ends the shift action when the elapsed time from the reference time exceeds the first time even if the elapsed time from the switch time point is within the predetermined time.

4. The shift control device of the automatic transmission according to claim 1, wherein, on a basis of a required time that is needed for a shift if the shift is properly performed, each of the first time and the second time is set at a time that, at least, is longer than the required time.

5. The shift control device of the automatic transmission according to claim 1, wherein each of the first time and the second time is set on a basis of a fashion of a shift and a change of the gear step during the shift.

6. The shift control device of the automatic transmission according to claim 1, wherein each of the first time and the second time is set on a basis of one of at least a vehicle speed, an input torque of the automatic transmission, and an oil temperature of the automatic transmission.

7. The shift control device of the automatic transmission according to claim 1, wherein the predetermined time is corrected on a basis of the elapsed time from the reference time to the switch time point.

8. A shift control method of an automatic transmission that establishes a plurality of gear steps of different speed change ratios by selectively engaging a plurality of friction engagement devices, comprising:

using one of a shift start time point and an inertia phase start time point as a reference time, and compulsorily ending, in a power-off shift, a shift action when an elapsed time from the reference time exceeds a first time;

compulsorily ending, in a power-on shift, the shift action when the elapsed time from the reference time exceeds a second time that is set shorter than the first time; and compulsorily ending, if a switch from the power-off shift to the power-on shift occurs halfway through the power-off shift, the shift action when the elapsed time from a switch time point of the switch exceeds a predetermined time.

9. The shift control method of the automatic transmission according to claim 8, wherein the predetermined time is the second time.

10. The shift control method of the automatic transmission according to claim 8, further comprising compulsorily ending the shift action when the elapsed time from the reference time exceeds the first time even if the elapsed time from the switch time point is within the predetermined time.

11. The shift control method of the automatic transmission according to claim 8, wherein, on a basis of a required time that is needed for a shift if the shift is properly performed, each of the first time and the second time is set at a time that, at least, is longer than the required time.

12. The shift control method of the automatic transmission according to claim 8, wherein each of the first time and the second time is set on a basis of a fashion of a shift and a change of the gear step during the shift.

13. The shift control method of the automatic transmission according to claim 8, wherein each of the first time and the second time is set on a basis of one of at least a vehicle speed, an input torque of the automatic transmission, and an oil temperature of the automatic transmission.

14. The shift control method of the automatic transmission according to claim 8, wherein the predetermined time is corrected on a basis of the elapsed time from the reference time to the switch time point.

* * * * *